United States Patent
Zhang et al.

(10) Patent No.: US 11,345,865 B2
(45) Date of Patent: May 31, 2022

(54) MICRO-INTERFACE STRENGTHENING REACTION SYSTEM AND METHOD FOR PREPARING SHIP FUEL

(71) Applicant: NANJING YANCHANG REACTION TECHNOLOGY RESEARCH INSTITUTE CO., LTD., Nanjing (CN)

(72) Inventors: Zhibing Zhang, Nanjing (CN); Zheng Zhou, Nanjing (CN); Weimin Meng, Nanjing (CN); Feng Zhang, Nanjing (CN); Lei Li, Nanjing (CN); Baorong Wang, Nanjing (CN); Gaodong Yang, Nanjing (CN); Huaxun Luo, Nanjing (CN); Guoqiang Yang, Nanjing (CN); Hongzhou Tian, Nanjing (CN); Yu Cao, Nanjing (CN)

(73) Assignee: Nanjing Yanchang Reaction Technology Research Institute Co., Ltd., Nanjing (CN)

( * ) Notice: Subject to any disclaimer, the term of this patent is extended or adjusted under 35 U.S.C. 154(b) by 3 days.

(21) Appl. No.: 17/042,914

(22) PCT Filed: Jun. 6, 2019

(86) PCT No.: PCT/CN2019/090321
§ 371 (c)(1),
(2) Date: Sep. 29, 2020

(87) PCT Pub. No.: WO2020/186642
PCT Pub. Date: Sep. 24, 2020

(65) Prior Publication Data
US 2021/0363434 A1    Nov. 25, 2021

(30) Foreign Application Priority Data
Mar. 15, 2019 (CN) .......................... 201910196587.0

(51) Int. Cl.
*C10G 49/00* (2006.01)
*B01J 10/00* (2006.01)
*C10G 49/26* (2006.01)

(52) U.S. Cl.
CPC .......... *C10G 49/002* (2013.01); *B01J 10/002* (2013.01); *B01J 10/007* (2013.01); *C10G 49/26* (2013.01);
(Continued)

(58) Field of Classification Search
CPC ................. C10G 49/002; C10G 49/26; C10G 2300/1044; C10G 2300/202;
(Continued)

(56) References Cited

U.S. PATENT DOCUMENTS

| 4,740,293 | A | * | 4/1988 | Dickinson | ............. | C10B 57/045 208/131 |
| 2013/0289328 | A1 | * | 10/2013 | Choi | ........................ | C10G 3/42 585/841 |
| 2016/0122666 | A1 | * | 5/2016 | Weiss | ........................ | C10L 1/08 208/59 |

FOREIGN PATENT DOCUMENTS

CN          107497372        * 12/2017

* cited by examiner

Primary Examiner — Randy Boyer
Assistant Examiner — Juan C Valencia

(57) ABSTRACT

The present invention relates to a micro-interface strengthening reaction system and method for heavy oil hydrogenation preparation of ship fuel, including a liquid phase feed unit, a gas phase feed unit, a micro-interface generator, a fixed-bed reactor and a separation tank. The present invention may reduce the pressure during the reaction by 10-80% while ensuring the efficiency of the reaction by breaking the gas to form micro-sized micro-bubbles and making the micro-bubbles mix with heavy oil to form an emulsion to increase the area between the gas and the liquid phase and (Continued)

to achieve the effect of enhancing mass transfer in a lower preset range. And, the present invention greatly enhances the mass transfer, so that the gas-liquid ratio can be greatly reduced. Also, the method of the present invention has low process severity, high production safety, low product cost per ton, and strong market competitiveness.

9 Claims, 2 Drawing Sheets

(52) U.S. Cl.
CPC ............... *C10G 2300/1044* (2013.01); *C10G 2300/202* (2013.01); *C10G 2400/06* (2013.01)

(58) Field of Classification Search
CPC .... C10G 2400/06; C10G 45/02; C10G 45/04; C10G 45/06; C10G 45/08; C10G 2300/70; B01J 10/002; B01J 10/007; B01J 2208/0053; B01J 2208/00911; B01J 2208/025; B01J 8/009; B01J 8/025; B01J 8/0278; B01J 8/0285; B01J 8/0453; B01J 8/001; B01J 8/02
See application file for complete search history.

MICRO-INTERFACE STRENGTHENING REACTION SYSTEM AND METHOD FOR PREPARING SHIP FUEL

BACKGROUND TECHNOLOGY

Technical Field

The present invention relates to the technical field of heavy oil hydrogenation, in particular, to a micro-interface strengthening reaction system and method for heavy oil hydrogenation preparation of ship fuel.

Description of Related Art

The heavy oil hydrogenation process mainly employs hydrogenation treatment to greatly reduce the content of impurities such as sulfur, nitrogen, and metals in heavy oil raw materials, and to hydrogenate non-ideal components such as fused ring aromatic hydrocarbons, gums, and asphaltenes, so as to increase the ratio of hydrogen to carbon, reduce the content of residual carbon, and significantly improve the cracking performance. The fixed-bed heavy oil hydrogenation technique is a heavy oil deep process technique, wherein the desulfurization, denitrification, demetalization, etc. of atmospheric or vacuum heavy oil to maximize the acquisition of light products in a fixed-bed reactor equipped with a specific catalyst under high temperature and high pressure in the presence of hydrogen is one of the important means of lightening heavy oil. The fixed-bed heavy oil hydrogenation technique has been used more and more widely due to advantages of high liquid product yield, good product quality, strong production flexibility, less waste and waste, environmentally friendly, and high return on investment.

During the fixed-bed heavy oil hydrogenation process, the reactors are used in the mode of series connection of a plurality of reactors and beds, and the dosage form of the catalyst is optimized according to the original oil properties, reaction conditions and target product requirements to carry out gradation filling according to different physical properties, catalyst activities and various catalyst ratios. Although the fixed-bed heavy oil hydrogenation technical has many advantages, the pressure drop of the reactor is prone to increase in the production process. Industrial operation shows that the increase in reactor pressure drop is one of the important factors restricting the full-load production and long-term operation of the device. In particular, when a plurality of reactors are in series connection, the reactor arranged in front is responsible for more than 70% of the demetallization reaction load, and metal sulfides are deposited on the catalyst bed, so that the pressure drop inevitably increases rapidly in the middle and late stages of operation; and for the subsequent reactors, the pressure drop increases slowly due to the significantly lower load of demetallization. This resulted in uneven load distribution between the front reactor and the rear reactor, which affects the operation cycle of the device and the stable operation of the device.

Chinese Patent Publication Number: CN103059979B discloses a fixed-bed heavy oil hydrogenation method. The method includes: mixing the heavy oil raw material with hydrogen and passing through the pretreatment section in an upstream mode for performing pre-hydrogenation reaction under hydrogenation conditions, and then passing through the hydrodemetalization, hydrodesulfurization and hydrodenitrogenation reaction sections in sequence. The pretreatment reaction section is filled with two different specifications of solid substances, and a metal cage holding the fixed-bed and a particulate catalyst; the particulate catalyst is located in a space formed by the metal cage.

It can be seen that the method has the following problems:
first, the hydrogen pressure used in the method is too large during operation, there is a potential safety hazard during operation, a large amount of resources are consumed, and the process operation cost is high;
second, in order to ensure the activity of the catalyst, the method requires a higher reaction temperature, and the energy consumption of the process is further increased while increasing the reaction temperature in the fixed-bed;
third, in the method, only hydrogen is mixed with gasoline, so that hydrogen molecules cannot be fully mixed with gasoline, resulting in a decrease in reaction efficiency.

SUMMARY

To this end, the present invention provides a micro-interface strengthening reaction system and method for heavy oil hydrogenation preparation of ship fuel, so as to overcome the problem of excessively high process energy consumption caused by the inability of hydrogen to fully contact gasoline in the prior art.

In accordance with an aspect of the present invention, there is provided a micro-interface strengthening reaction system for heavy oil hydrogenation preparation of ship fuel, which includes:

a liquid phase feed unit for storing and transporting heavy oil;

a gas phase feed unit for storing and transporting hydrogen;

at least one micro-interface generator, connected to the liquid phase feed unit and the gas phase feed unit respectively for converting a pressure energy of a gas and/or a kinetic energy of a liquid into a surface energy of a bubble and transfer the surface energy to a hydrogen bubble such that the hydrogen is broken to form micro-bubbles with a diameter greater than or equal to 1 μm and less than 1 mm to increase a mass transfer area between the heavy oil and the hydrogen and such that the heavy oil is mixed with the microbubbles to form a gas-liquid emulsion to enhance a reaction efficiency between the heavy oil and the hydrogen within a preset pressure range after the hydrogen is broken;

a fixed-bed reactor, connected to the micro-interface generator for loading the gas-liquid emulsion and providing a reaction space for the heavy oil and the microbubbles in the gas-liquid emulsion; and a separation tank for gas-liquid separation of a mixture of a ship fuel and a reacted mixed gas in the fixed-bed reactor.

Preferably, when the number of the micro-interface generators is greater than or equal to two, the micro-interface generators are arranged in parallel in series and/or parallel connection for outputting the mixed gas-liquid emulsion to the fixed-bed reactor for reaction.

Preferably, the micro-interface generator is one or more of a pneumatic micro-interface generator, a hydraulic micro-interface generator and a gas-liquid linkage micro-interface generator.

Preferably, the liquid phase feed unit includes:
a liquid raw material tank, for storing the heavy oil;
a feed pump, connected to the liquid raw material tank for providing power for the transportation of the heavy oil;
a liquid feed preheater, connected to the feed pump for preheating the heavy oil transported by the feed pump such that the heavy oil reaches a specified temperature, the liquid feed preheater being provided a shunt pipe at an outlet for transporting the heavy oil to the corresponding micro-interface generator respectively; and when the liquid phase feed unit is transporting the heavy oil, the feed pump operates to pump the heavy oil out of the liquid raw material tank and send the heavy oil to the liquid feed preheater, and the liquid feed preheater heats the heavy oil to the specified temperature and then transports the gasoline to the micro-interface generator.

Preferably, the gas phase feed unit includes:

a gas raw material buffer tank, for storing hydrogen;

a compressor, connected to the gas raw material buffer tank for providing power for the transportation of the hydrogen;

a gas feed preheater, connected to the compressor for preheating the hydrogen transported by the compressor such that the heavy oil reaches a specified temperature, the gas feed preheater being provided a shunt pipe at an outlet for transporting the hydrogen to the corresponding micro-interface generator respectively; and when the gas phase feed unit is transporting hydrogen, the compressor operates to pump the hydrogen from the gas raw material buffer tank and send the hydrogen to the gas feed preheater for preheating, and the gas feed preheater transports the hydrogen to the micro-interface generator so that the micro-interface generator breaks the hydrogen to a specified size after the preheating is completed.

Preferably, the fixed-bed reactor includes:

a reaction tank, a tank body for providing a reaction space for the gas-liquid emulsion, the reaction tank being provided with a discharge port for outputting a reacted ship fuel and a mixed gas; and at least one layer of catalyst bed, fixed at a specified position inside the reaction tank, the catalyst bed being inside provided with a catalyst for improving the reaction efficiency of each substance in the gas-liquid emulsion, wherein when the gas-liquid emulsion is flowing through the catalyst bed, the catalyst in the catalyst bed will contact the gas-liquid emulsion to improve the reaction efficiency of each substance in the gas-liquid emulsion.

Preferably, a top end of the separation tank is provided with a gas phase outlet for transporting the mixed gas, and a bottom end of the separation tank is provided with a liquid phase outlet for transporting the ship fuel, wherein after the gas-liquid emulsion is reacted in the fixed-bed reactor, the separation tank transports the reacted mixture to the separation tank, the ship fuel in the mixture settles to the bottom end of the separation tank by gravity and is output from the system through the liquid phase outlet, and the mixed gas in the mixture is output from the system through the gas phase outlet.

In accordance with another aspect of the present invention, there is provided a micro-interface strengthening reaction method for heavy oil hydrogenation preparation of ship fuel, including steps of:

step 1: adding a specified amount of heavy oil to the liquid raw material tank and adding a specified amount of hydrogen to the gas raw material buffer tank before operating the system;

step 2: starting the system after the addition, extracting the heavy oil from the liquid raw material tank through the feed pump, and extracting the hydrogen from the gas raw material buffer tank through the compressor;

step 3: flowing the heavy oil through the liquid feed preheater, heating the heavy oil to a specified temperature by the liquid feed preheater, flowing the hydrogen through the gas feed preheater, and heating the hydrogen to a specified temperature by the gas feed preheater;

step 4: diverting the heavy oil after preheating, transporting the diverted heavy oil to the corresponding micro-interface generators respectively, diverting the hydrogen after preheating, and transporting the diverted hydrogen to the corresponding micro-interface generators respectively;

step 5: controlling a ratio of the heavy oil and the hydrogen received respectively and breaking the hydrogen into micron-sized microbubbles by the micro-interface generator, and mixing the micro-bubbles with the heavy oil to form a gas-liquid emulsion by each of the micro-interface generators after breaking;

step 6: transporting the gas-liquid emulsion to the fixed-bed reactor by each of the micro-interface generators after mixing, controlling a pressure and a temperature in the fixed-bed reactor, and flowing the gas-liquid emulsion in a specified direction;

step 7: flowing the gas-liquid emulsion through the catalyst bed, controlling an airspeed of the gas-liquid emulsion such that the catalyst arranged in the catalyst bed promotes the reaction of sulfur elements inside the heavy oil in the gas-liquid emulsion with the microbubbles to form the ship fuel and a hydrogen sulfide gas, wherein the hydrogen sulfide gas may form the mixed gas with the hydrogen; and step 8: transporting a mixture formed by the ship fuel and the mixed gas to the separation tank by the fixed-bed reactor after the reaction, wherein the mixture settles in the separation tank, the ship fuel settles in a lower layer of the separation tank and is output from the system through the liquid phase outlet for subsequent processing, and the mixed gas stays in an upper layer of the separator tank after the ship fuel settles and is output from the system through the gas phase outlet for subsequent processing.

Preferably, the fixed-bed reactor in the step 6 has inside a reaction pressure of 1-14 MPa and a reaction temperature of 350-430° C.

Preferably, the gas-liquid emulsion in the step 7 has an airspeed of $0.1$-$0.5$ $h^{-1}$.

Compared with the traditional fixed-bed reactor, the present invention has the following beneficial effects: the present invention may reduce the pressure during the reaction by 10-80% while ensuring the efficiency of the reaction by breaking the gas to form micro-sized micro-bubbles and making the micro-bubbles mix with heavy oil to form an emulsion to increase the area between the gas and the liquid phase and to achieve the effect of enhancing mass transfer in a lower preset range; and, the present invention greatly enhances the mass transfer, so that the gas-liquid ratio can be greatly reduced, which not only reduces the material consumption of the gas, but also reduces the energy consumption of the subsequent gas cycle compression; also, the method of the present invention has low process severity, high production safety, low product cost per ton, and strong market competitiveness.

In particular, for the system of the present invention, the operating temperature will be adjusted appropriately according to the active temperature of the catalyst used when different catalysts are used; therefore, the system of the present invention also has the advantage of being able to significantly or double the operating pressure and increase the space velocity (throughput) under different catalyst systems.

Particularly, when the micron-sized bubbles collide with the movement of the catalyst particles, the bubbles are not easy to coalesce and may basically maintain the original shape. Thus, the contact area between the gas phase and the liquid phase in the fixed-bed reactor increases geometrically, and makes the emulsification and mixing more sufficient and stable, so as to achieve the effect of enhancing mass transfer and macro-reaction.

Further, the liquid phase feed unit and the gas phase feed unit are provided with a feed pump and a compressor respectively, so that the feed pump and compressor may respectively provide power for the transportation of heavy oil and hydrogen when the system is operated such that the heavy oil and hydrogen may be transported to the designated device at a designated rate, thereby improving the operating efficiency of the system.

In particular, the liquid phase feed unit and the gas phase feed unit are further provided with a liquid feed preheater and a gas feed preheater, wherein the liquid feed preheater and gas feed preheater may respectively preheat the heavy oil and the hydrogen when the heavy oil and the hydrogen are transported, so that the fixed-bed reactor may not require high-power heating for the heavy oil and the hydrogen during operation, thereby saving the resource consumption of the fixed-bed and reducing the energy consumption of the system.

Further, the system is provided with at least one micro-interface generator, so that the system may mix the heavy oil and the hydrogen in different ratios by using a plurality of micro-interface generators for significantly improving the reaction efficiency of each substance in the gas-liquid emulsion when reacting with the catalyst.

In particular, the fixed-bed reactor is provided inside with at least one layer of catalyst bed, wherein the reaction rate of the gas-liquid emulsion may be further increased by using a plurality of layers of catalysts to fully contact the gas-liquid emulsion, thereby further enhancing the operating efficiency of the system.

Further, the separation tank uses gravity for gas-liquid separation of the reacted mixture without the need for extra separation devices for the separation tank, so as to further reduce the energy consumption of the system.

In particular, in the micro-interface strengthening reaction method for heavy oil hydrogenation preparation of ship fuel, the temperature and pressure in the reaction tank are also restricted, so that the energy consumption of the system is kept to a minimum while ensuring that the gas-liquid emulsion in the reaction tank may react efficiently, thereby further reducing the energy consumption of the system.

In particular, in the micro-interface strengthening reaction method for heavy oil hydrogenation preparation of ship fuel, the space velocity of the catalyst is also controlled to ensure that the various substances in the gas-liquid emulsion may react with the highest efficiency for further improving the operating efficiency of the system.

DETAIL DESCRIPTIONS

Figure 1:
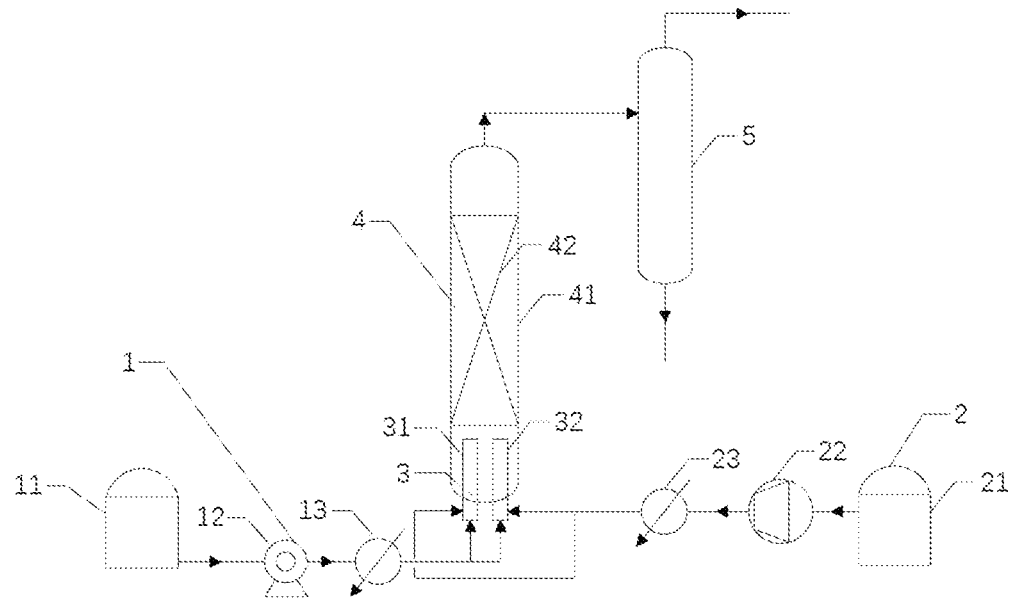
FIG. 1 is a structural diagram of the under-mounted micro-interface strengthening reaction system for heavy oil hydrogenation preparation of ship fuel of the present invention.

In order to make the purpose and advantages of the invention clearer, the invention will be further described below in conjunction with the embodiments. It should be understood that the specific embodiments described here are only used to explain the invention, and are not used to limit the invention.

It should be understood that in the description of the invention, orientations or position relationships indicated by terms upper, lower, front, back, left, right, inside, outside and the like are orientations or position relationships are based on the direction or position relationship shown in the drawings, which is only for ease of description, rather than indicating or implying that the device or element must have a specific orientation, be constructed and operated in a specific orientation, and therefore cannot be understood as a limitation of the invention.

Further, it should also be noted that in the description of the invention, terms "mounting", "connected" and "connection" should be understood broadly, for example, may be fixed connection and also may be detachable connection or integral connection; may be mechanical connection and also may be electrical connection; and may be direct connection, also may be indirection connection through an intermediary, and also may be communication of interiors of two components. Those skilled in the art may understand the specific meaning of terms in the invention according to specific circumstance.

System Embodiment 1

With reference to FIG. 1, a structural diagram of the under-mounted micro-interface strengthening reaction system for heavy oil hydrogenation preparation of ship fuel of the present invention is shown, including a liquid feed unit 1, a gas feed unit 2, a micro-interface generator 3 (MIG), a fixed-bed reactor 4 and a separation tank 5, wherein the micro-interface generator 3 is connected to the liquid feed unit 1 and the gas feed unit 2 respectively to receive heavy oil transported by the liquid feed unit 1 and hydrogen transported by the gas feed unit 2; the fixed-bed reactor 4 is connected to the micro-interface generator 3, and an output end of the micro-interface generator 3 is arranged inside the fixed-bed reactor 4, to output a gas-liquid emulsion in the micro-interface generator 3 to the fixed-bed reactor; the separation tank 5 is connected to the fixed-bed reactor 4 to receive a mixture output from the fixed-bed reactor 4 and perform gas-liquid separation of the mixture.

When the system is operated, the liquid feed unit 1 is started to transport the heavy oil stored inside to the micro-interface generator 3 while the gas feed unit 2 is started to transport the hydrogen stored inside to the micro-interface generator 3, and the micro-interface generator 3 breaks the hydrogen to a micrometer size to form micro-bubbles with a diameter greater than or equal to 1 μm and less than 1 mm; after the breaking is completed, the micro-interface generator 3 mixes micro-bubbles with the heavy oil to form a gas-liquid emulsion, and the micro-interface generator 3 outputs the gas-liquid emulsion to the fixed-bed reactor 4 after the gas-liquid emulsion is mixed to make the gas-liquid emulsion react efficiently in the fixed-bed reactor by controlling the temperature, air pressure, and space velocity of the gas-liquid emulsion in the fixed-bed reactor 4; after the reaction is completed, the fixed-bed reactor 4 outputs the resulting mixture to the separation tank 5, which separates the ship fuel in the mixture from the mixed gas of hydrogen and hydrogen sulfide and performs subsequent treatments respectively. Those skilled in the art may understand that the system of the present invention can be used not only for the hydrogenation of heavy oil, but also for the hydrogenation of gasoline, diesel, wax oil, lubricating oil or other kinds of low molecular weight oils, as long as the system can hydrogenate the oil to make the oil react efficiently and reach the specified standard after the reaction. Moreover, the system of the present invention may also be applied to other multiphase reactions, such as making the materials form multiphase fluids formed by micron-sized particles such as multiphase micro-mixed fluid, multiphase micro-nano fluid, multiphase emulsified fluid, multiphase microstructure fluid, gas-liquid-solid micro-mixed fluid, gas-liquid-solid micro-nano fluid, gas-liquid-solid emulsified fluid, gas-liquid-solid microstructure fluid, microbubble, microbubble fluid, microbubble, microbubble fluid, micro-gas-liquid fluid, gas-liquid micro-nano emulsion fluid, ultra-micro fluid, microdispersion fluid, two-phase micro-mixed fluid, micro-turbulent fluid, micro-bubble fluid, micro-bubble, micro-bubble fluid, micro-nano bubble and micro-nano bubble fluid, or form multiphase fluids (referred to micro-interface fluids) formed by micro nano sized particles, through micro-interface device, micro-nano interfacial device, ultra-micro-interface device, micro-bubble bioreactor or micro-bubble bioreactor and other devices, with processes or methods such as micro-mixing, micro-fluidization, ultra-micro-fluidization, micro-bubble fermentation, micro-bubble bubbling, micro-bubble mass transfer, micro-bubble transfer, micro-bubble reaction, micro-bubble absorption, micro-bubble oxygenation, and micro-bubble contact, thereby effectively increasing the mass transfer area of the phase boundary between the gas and/or liquid phase and the liquid and/or solid phase during the reaction.

With continuous reference to FIG. 1, in an embodiment of the present invention, the liquid feed unit 1 includes a liquid raw material tank 11, a feed pump 12 and a liquid feed preheater 13, wherein the feed pump 12 is connected to the liquid raw material tank 11 for pumping out the heavy oil in the liquid raw material tank 11; the liquid feed preheater 13 is arranged at an output end of the feed pump 12 and the liquid feed preheater 13 is connected to the micro-interface generator 3 for preheating the heavy oil output by the feed pump 12 and transporting the heavy oil to the micro-interface generator 3 after preheating. When the liquid feed unit 1 is operated, the feed pump 12 will extract the heavy oil stored in the liquid raw material tank 11 and transport it to the liquid feed preheater 13, and after the liquid feed preheater 13 preheats the heavy oil to a specified temperature, the heavy oil is transported to the micro-interface generator 3.

Specifically, the liquid raw material tank 11 is a tank body for storing the heavy oil, and the liquid raw material tank 11 is connected to the feed pump 12 to transport the heavy oil to a designated location through the feed pump 12 when the system is operated. It is to be understood that the liquid raw material tank 11 may be a metal oil tank or a non-metal oil tank, as long as the liquid raw material tank 11 may be loaded with a specified amount of heavy oil.

Specifically, the feed pump 12 is a centrifugal pump, which is arranged at an outlet of the liquid raw material tank 11 to provide power for the transportation of the heavy oil. When the liquid feed unit 1 is operated, the feed pump 12 is operated, and the heavy oil in the liquid raw material tank 1 is pumped out and transported to the liquid feed preheating unit 13. It is to be understood that the model and power of the feed pump 12 are not specifically limited in the present embodiment, as long as the feed pump 12 may transport the heavy oil at a specified flow rate.

Specifically, the liquid feed preheater 13 is a preheater for preheating the heavy oil, and an outlet of the liquid feed preheater 13 is provided with a shunt pipe for transporting the preheated heavy oil to the inside of each micro-interface generator. When the feed pump 12 transports the heavy oil, the heavy oil will flow through the liquid feed preheater 13, and the liquid feed preheater 13 will preheat the heavy oil and shunt the heavy oil after reaching a specified temperature to transport the heavy oil to the inside of each micro-interface generator respectively. It is to be understood that the type of preheater and heating method of the liquid feed preheater 13 are not specifically limited in the present embodiment, as long as the liquid feed preheater 13 may preheat the heavy oil to a specified temperature.

With continuous reference to FIG. 1, in an embodiment of the present invention, the gas feed unit 2 includes a gas raw material buffer tank 21, a compressor 22 and a gas feed preheater 23, wherein the compressor 22 is connected to the gas raw material buffer tank 21 for pumping out the hydrogen in the gas raw material buffer tank 21; the gas feed preheater 23 is arranged at an output end of the compressor 22 and the gas feed preheater 23 is connected to the micro-interface generator 3 for preheating the hydrogen output by the compressor 22 and transporting the hydrogen to the micro-interface generator 3 after preheating. When the gas feed unit 2 is operated, the compressor 22 will extract the hydrogen stored in the gas raw material buffer tank 21 and transport it to the gas feed preheater 23, and after the gas feed preheater 23 preheats the hydrogen to a specified temperature, the hydrogen is transported to the micro-interface generator 3.

Specifically, the gas raw material buffer tank 21 is a tank body for storing the hydrogen, and the gas raw material buffer tank 21 is connected to the compressor 22 to transport the hydrogen to a designated location through the compressor 22 when the system is operated. It is to be understood that the type of the gas raw material buffer tank 21 is not specifically limited in the present embodiment, as long as the gas raw material buffer tank 21 may be loaded with a specified amount of hydrogen.

Specifically, the compressor 22 is arranged at an outlet of the gas row material buffer tank 21 for providing power for the transportation of the hydrogen; When the gas feed unit 2 is operated, the compressor 22 is operated, and the hydrogen in the gas raw material tank 2 is pumped out and transported to the gas feed preheating unit 23. It is to be understood that the model and power of the compressor 22 are not specifically limited in the present embodiment, as long as the compressor 22 may transport the hydrogen at a specified flow rate.

Specifically, the gas feed preheater 23 is a preheater for preheating the hydrogen, and an outlet of the gas feed preheater 23 is provided with a shunt pipe for transporting the preheated hydrogen to the inside of each micro-interface generator. When the compressor 22 transports the hydrogen, the hydrogen will flow through the gas feed preheater 23, and the gas feed preheater 23 will preheat the hydrogen and shunt the hydrogen after reaching a specified temperature to transport the hydrogen to the inside of each micro-interface generator respectively. It is to be understood that the type of preheater and heating method of the gas feed preheater 23 are not specifically limited in the present embodiment, as long as the gas feed preheater 23 may preheat the hydrogen to a specified temperature.

With continuous reference to FIG. 1, the micro-interface generator 3 of the present invention includes a first micro-interface generator 31 and a second micro-interface generator 32, wherein the first micro-interface generator 31 and the second micro-interface generator 32 are vertically arranged at a bottom of the fixed-bed reactor 4, and the first micro-interface generator 31 is parallel to the second micro-interface generator 32; an output port of each micro-interface generator is arranged inside the fixed-bed reactor 4 for outputting the gas-liquid emulsion to the fixed-bed reactor 4. When the micro-interface generator 3 is operated, the first micro-interface generator 31 and the second micro-interface generator 32 will respectively receive specified amounts of heavy oil and hydrogen; after receiving, the first micro-interface generator 31 and the second micro-interface generator 32 will break the received hydrogen gas and break the hydrogen gas to a micrometer size to form micro bubbles; after the breaking is completed, the microbubbles are mixed with the heavy oil to form a gas-liquid emulsion, and after the mixing is completed, the gas-liquid emulsion is output to the fixed-bed reactor 4. It is to be understood that the micro-interface generator 3 may be connected to the fixed-bed reactor 4 through pipelines, or such that the output end of the micro-interface generator 3 is arranged inside the fixed-bed reactor 4 or through other ways, as long as the micro-interface generator 3 may output the gas-liquid emulsion to the inside 4 of the fixed-bed reactor.

Specifically, the first micro-interface generator 31 is a gas-liquid linkage micro-interface generator, which is arranged at a bottom of the fixed-bed reactor 4 and is respectively connected to the liquid feed preheater 13 and the gas feed preheater 23 for breaking the hydrogen and outputting the gas-liquid emulsion formed by mixing the micro bubbles and the heavy oil to the inside of the fixed-bed reactor 4. When the micro-interface generator 3 is operated, the first micro-interface generator 31 will respectively receive specified amounts of heavy oil and hydrogen, and break the hydrogen bubbles to a micrometer size with the pressure of the gas and the kinetic energy of the liquid; after the breaking is completed, the micro bubbles are severely mixed with the heavy oil to form a gas-liquid emulsion, and after the mixing is completed, the gas-liquid emulsion is output to the fixed-bed reactor 4.

Specifically, the second micro-interface generator 32 is a pneumatic micro-interface generator, which is arranged at a bottom of the fixed-bed reactor 4 and is respectively connected to the liquid feed preheater 13 and the gas feed preheater 23 for breaking the hydrogen and outputting the gas-liquid emulsion formed by mixing the micro bubbles and the heavy oil to the inside of the fixed-bed reactor 4. When the micro-interface generator 3 is operated, the first micro-interface generator 31 will respectively receive specified amounts of heavy oil and hydrogen, and break the hydrogen bubbles to a micrometer size with the pressure energy of the gas; after the breaking is completed, the micro bubbles are severely mixed with the heavy oil to form a gas-liquid emulsion, and after the mixing is completed, the gas-liquid emulsion is output to the fixed-bed reactor 4.

With reference to FIG. 1, in an embodiment of the present invention, the fixed-bed reactor 4 includes a reaction tank 41 and a catalyst bed 42, wherein the catalyst bed 42 is arranged inside the reaction tank 41 for loading a catalyst. When the fixed-bed reactor 4 is operated, the micro-interface generator 3 will output the gas-liquid emulsion to the bottom of the reaction tank 41, the gas-liquid emulsion will gradually flow upwards after entering the bottom of the reaction tank 41, and the gas-liquid emulsion contacts the catalyst built into the catalyst bed 42 during the flow process and starts to react, so that the sulfur element contained in the heavy oil in the gas-liquid emulsion reacts with micro bubbles to generate hydrogen sulfide, thereby completing the preparation of ship fuel. It is to be understood that the catalyst may be one or a mixture of molybdenum-based catalysts, cobalt-based catalysts, tungsten-based catalysts, nickel-based catalysts, and iron-based catalysts, as long as the catalyst may improve the reaction efficiency of each substance in the gas-liquid emulsion. In another words, the present invention is applicable to the above mentioned catalyst systems, as well as other hydrogenation catalyst systems not mentioned, as long as the operating temperature will be adjusted appropriately according to the active temperature of the catalyst used when different catalysts are used for the system of the present invention and the system has the advantage of being able to significantly or double the operating pressure and increase the space velocity (throughput) under different catalyst systems.

Specifically, the reaction tank 41 is a cylindrical metal tank with a feed port at the bottom for receiving the gas-liquid emulsion output by the micro-interface generator 3 and with a discharge port at the top connected to the separation tank 5 for transporting the reacted mixture to the separation tank 5 for gas-liquid separation. When the fixed-bed reactor 4 is in operation, the feed port of the reaction tank 41 will receive the gas-liquid emulsion output by the micro-interface generator 3 and provide a reaction space for the gas-liquid emulsion; after the gas-liquid emulsion is reacted, a mixture of ship fuel and mixed gas is formed, and the reaction tank 41 outputs the mixture to the separation tank 5 through the discharge port. It is to be understood that the size and material of the reaction tank 41 are not specifically limited in the present embodiment, as long as the reaction tank 41 may be loaded with a specified amount of gas-liquid emulsion and has a specified strength to withstand the preset reaction temperature and reaction pressure.

Specifically, the catalyst bed 42 is at least one bed plate, and a catalyst is fixedly arranged inside the bed plate to increase the reaction speed of the gas-liquid emulsion. When the fixed-bed reactor 4 is operated, the gas-liquid emulsion in the reaction tank 41 will flow upward from the bottom of the reaction tank 41 and pass through the catalyst bed 42 during the flow; then, the catalyst in the catalyst bed 42 is in contact with the gas-liquid emulsion, and the catalyst causes the sulfur element in the heavy oil in the gas-liquid emulsion to react with micro bubbles to generate hydrogen sulfide to desulfurize and upgrade the heavy oil. It is to be understood that the catalyst bed 42 may be a grid, screen, ceramic ball or other types of structures, as long as the catalyst bed 42 may stably load the catalyst. In another words, the number of layers of the catalyst bed 42 may be one, two or other numbers, as long as the catalyst bed 42 may make the substances in the gas-liquid emulsion reach the specified reaction efficiency.

With continuous reference to FIG. 1, in an embodiment of the present invention, the separation tank 5 is a metal tank body connected to the discharge port of the reaction tank 41 for gas-liquid separation of the mixture output by the reaction tank 41. The separation tank 5 has a top end provided with a gas phase outlet for outputting hydrogen and hydrogen sulfide, and a bottom end provided with a liquid phase outlet for transporting ship fuel. After the fixed-bed reactor 4 outputs the reacted mixture to the separation tank 5, the separation tank 5 will use gravity to separate the mixed gas in the mixture from the ship fuel, and output the mixed gas containing hydrogen and hydrogen sulfide through the gas phase outlet, so as to output ship fuel through liquid phase outlet. It is to be understood that the size and material of the separation tank 5 are not specifically limited in the present embodiment, as long as the separation tank 5 has a specified strength and may be loaded with a mixture of a specified volume.

System Embodiment 2

Figure 2:
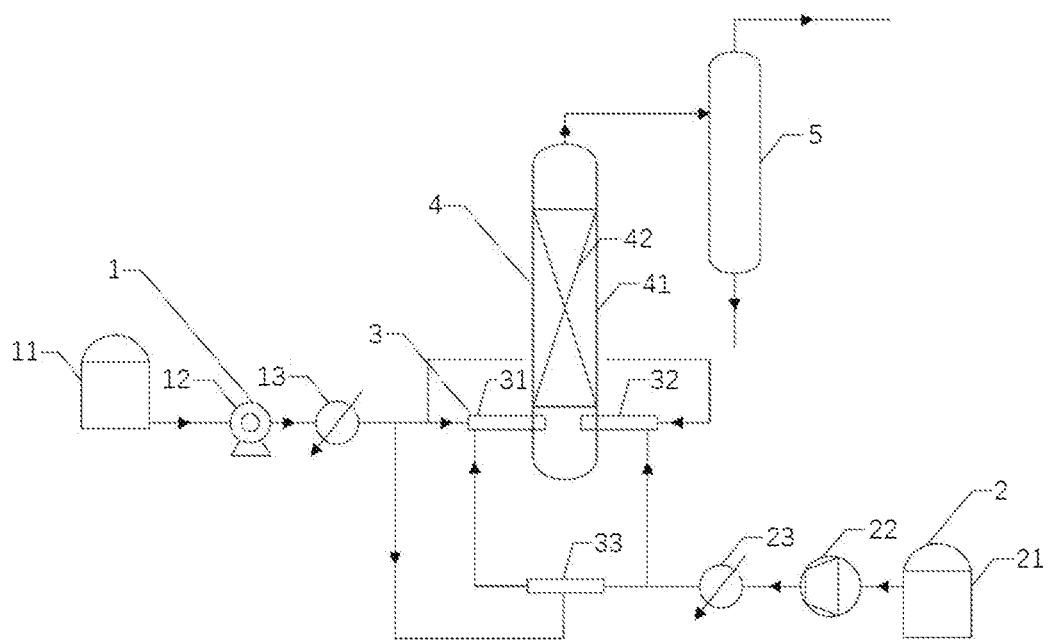
FIG. 2 is a structural diagram of the side-mounted hedge-type micro-interface strengthening reaction system for heavy oil hydrogenation preparation of ship fuel of the present invention.

With reference to FIG. 2, a structural diagram of the side-mounted hedge-type micro-interface strengthening reaction system for heavy oil hydrogenation preparation of ship fuel of the present invention is shown, and the components used in the system are the same as in System Embodiment 1.

The present embodiment differs from the above System Embodiment 1 in that the micro-interface generator 3 in the present embodiment is further provided with a third micro-interface generator 33, the third micro-interface generator 33 is arranged at the outlet of the gas feed preheater 23, and the third micro-interface generator 33 is connected in parallel with the second micro-interface generator 32, and is used to separately break a specified amount of hydrogen; the third micro-interface generator 33 is also connected in series with the first micro-interface generator 31 to perform multi-stage breaking of hydrogen, thereby further reducing the diameter of the micro bubbles.

The first micro-interface generator 31 and the second micro-interface generator 32 are respectively arranged on a side wall of the bottom of the reaction tank 4, and the first micro-interface generator 31 and the second micro-interface generator 32 are arranged oppositely, so that the first micro-interface generator 31 and the second micro-interface generator 32 collide with each other when outputting the gas-liquid emulsion, so as to make the gas-liquid emulsion mix more uniformly.

After the liquid feed unit 1 and the gas feed unit 2 respectively transport the heavy oil and the hydrogen to the micro-interface generator, and the third micro-interface generator 33 and the second micro-interface generator 32 respectively receive a specified amount of heavy oil and hydrogen to break the hydrogen to a micrometer size to form micro-bubbles and mix the heavy oil with the micro bubbles to form a gas-liquid emulsion; after breaking, the third micro-interface generator 33 will transport the gas-liquid emulsion to the first micro-interface generator 31 for further breaking, and after breaking, the second micro-interface generator 32 and the third micro-interface generator 33 will output the internal gas-liquid emulsion to the bottom of the reaction tank 4 and move from bottom to top; since the two micro-interface generators are arranged oppositely, when the first micro-interface generator 31 and the second micro-interface generator 32 output the gas-liquid emulsion, the two gas-liquid emulsion fluids will be offset at the bottom of the reaction tank 41, so as to achieve the secondary mixing of the gas-liquid emulsion to further increase the mass transfer area of the heavy oil and the micro bubbles between the gas-liquid emulsions.

System Embodiment 2

Figure 3:
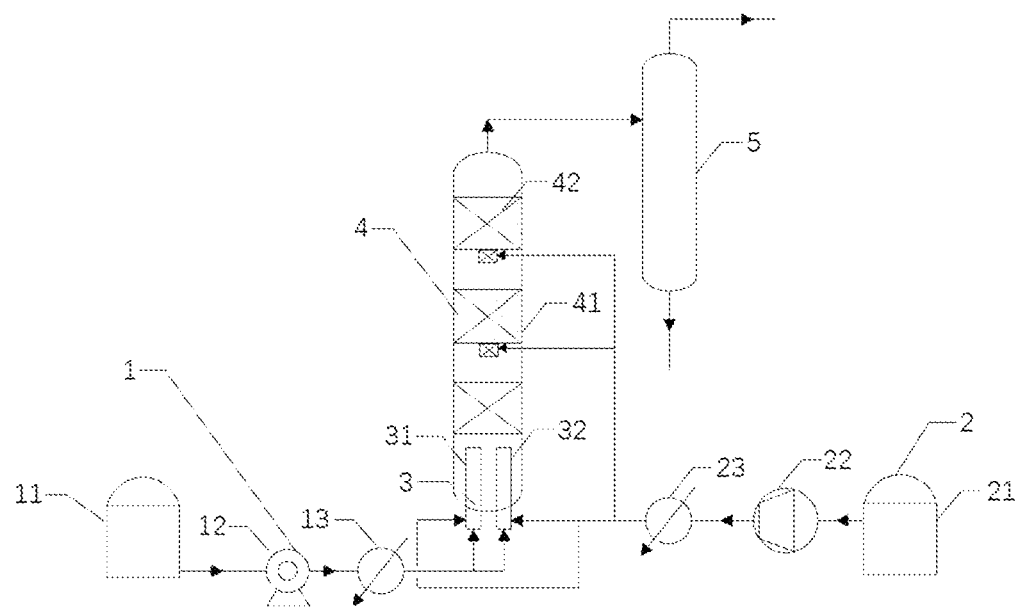
FIG. 3 is a structural diagram of the under-mounted multi-segment micro-interface strengthening reaction system for heavy oil hydrogenation preparation of ship fuel of the present invention.

With reference to FIG. 3, a structural diagram of the under-mounted multi-segment micro-interface strengthening reaction system for heavy oil hydrogenation preparation of ship fuel of the present invention is shown, and the components used in the system are the same as in System Embodiment 1.

The present embodiment differs from System Embodiment 1 in that the reaction tank 41 in the present embodiment is provided with a plurality of layers of catalyst beds 42 inside, and an air inlet is provided at the bottom of each catalyst bed 42 except for the lowermost catalyst bed 42 to transport the hydrogen output from the gas feed unit 2 to the inside of the reaction tank; the outlet of the gas feed preheating unit 23 is provided with a plurality of shunt pipes, which are used to transport the preheated hydrogen to the gas inlet at the bottom of each catalyst bed 42 to ensure the content of the hydrogen in the reaction tank 41.

After the gas feed preheating unit 23 finishes preheating the hydrogen, the hydrogen will be output, and a shunt pipe is arranged at the outlet of the gas feed preheating unit, the hydrogen starting to be shunted and transported to the corresponding parts after the hydrogen is output, wherein a part of the hydrogen is transported to the micro-interface generator 3 and is broken to form micro bubbles to form the gas-liquid emulsion with the heavy oil; and another part of hydrogen is transported to the inside of the reaction tank 41 and is transported to the bottom of each catalyst bed 42 through each air inlet; the reaction efficiency of each substance in the gas-liquid emulsion in the reaction tank 41 is ensured by maintaining the hydrogen content inside the reaction tank 41 within a specified range.

System Embodiment 4

Figure 4:
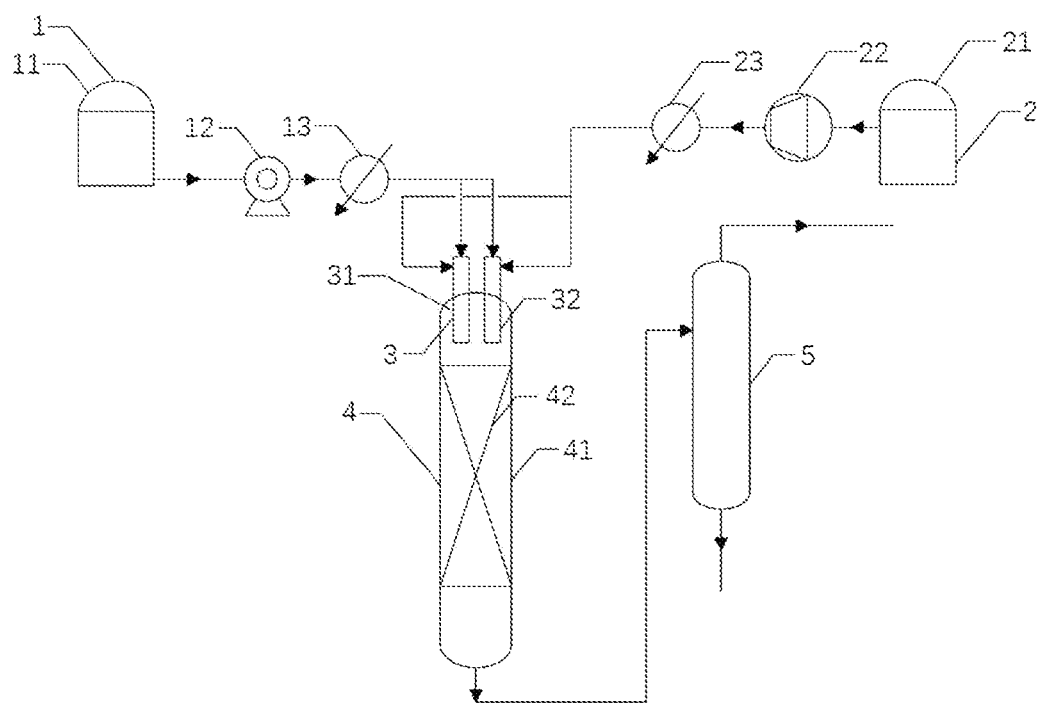
FIG. 4 is a structural diagram of the top-mounted micro-interface strengthening reaction system for heavy oil hydrogenation preparation of ship fuel of the present invention.

With reference to FIG. 4, a structural diagram of the top-mounted micro-interface strengthening reaction system for heavy oil hydrogenation preparation of ship fuel of the present invention is shown, and the components used in the system are the same as in System Embodiment 1.

The present embodiment differs from the above System Embodiment 1 in that the micro-interface generator 3 in the present embodiment is arranged at the top of the reaction tank 41, and the discharge port of the reaction tank 41 is arranged at the bottom of the tank body for making the gas-liquid emulsion output by the micro-interface generator 3 flow from top to bottom inside the reaction tank 41 by gravity to reduce the energy consumption of the system.

After the first micro-interface generator 31 and the second micro-interface generator 32 output the gas-liquid emulsion to the reaction tank 41, the gas-liquid emulsion is located above the inside of the reaction tank 41 and moves downward under the action of gravity, contacts with the catalyst in the catalyst bed 42 and starts to react during the movement, and output to the separation tank 5 through the discharge port at the bottom of the reaction tank 41 after the reaction. Since the gas-liquid emulsion is moved downward by gravity, the system in the present embodiment no longer needs to provide power for the movement of the gas-liquid emulsion in the reaction tank 41, thereby further reducing the energy consumption of the system.

Examples 1

The specific method and effect of the system of the present invention will be further described with reference to FIG. 1.

A micro-interface strengthening reaction method for heavy oil hydrogenation preparation of ship fuel includes steps of:

step 1: adding a specified amount of heavy oil to the liquid raw material tank 11 and adding a specified amount of hydrogen to the gas raw material buffer tank 21 before operating the system;

step 2: starting the system after the addition, extracting the heavy oil from the liquid raw material tank 11 through the feed pump 12, and extracting the hydrogen from the gas raw material buffer tank 21 through the compressor 22;

step 3: flowing the heavy oil through the liquid feed preheater 13, heating the heavy oil to a specified temperature by the liquid feed preheater 13, flowing the hydrogen through the gas feed preheater 23, and heating the hydrogen to a specified temperature by the gas feed preheater 23;

step 4: diverting the heavy oil after preheating, transporting the diverted heavy oil to the corresponding micro-interface generators respectively, diverting the hydrogen after preheating, and transporting the diverted hydrogen to the corresponding micro-interface generators respectively;

step 5: controlling a ratio of the heavy oil and the hydrogen received respectively and breaking the hydrogen into micron-sized microbubbles by the micro-interface generator, and mixing the micro-bubbles with the heavy oil to form a gas-liquid emulsion by each of the micro-interface generators after breaking;

step 6: transporting the gas-liquid emulsion to the fixed-bed reactor 4 by each of the micro-interface generators after mixing, controlling a pressure and a temperature in the fixed-bed reactor to 1-14 MPa and 350-430° C., and flowing the gas-liquid emulsion in a specified direction;

step 7: flowing the gas-liquid emulsion through the catalyst bed 42, controlling an airspeed of the gas-liquid emulsion to 0.1-0.5 $h^{-1}$ such that the catalyst arranged in the catalyst bed promotes the reaction of sulfur elements inside the heavy oil in the gas-liquid emulsion with the microbubbles to form the ship fuel and a hydrogen sulfide gas, wherein the hydrogen sulfide gas may form the mixed gas with the hydrogen;

step 8: transporting a mixture formed by the ship fuel and the mixed gas to the separation tank 5 by the fixed-bed reactor after the reaction, wherein the mixture settles in the separation tank 5, the ship fuel settles in a lower layer of the separation tank 5 and is output from the system through the liquid phase outlet for subsequent processing, and the mixed gas stays in an upper layer of the separator tank 5 after the ship fuel settles and is output from the system through the gas phase outlet for subsequent processing.

Specifically, in the step 5, a mixing ratio of the heavy oil and the hydrogen in each micro-interface generator is: a standard volume ratio of the hydrogen to the heavy oil is 0.25:1 in the first micro-interface generator, and a standard volume ratio of the hydrogen to the heavy oil is 1000:1 in the second micro-interface generator.

Specifically, in the step 5, after each micro-interface generator breaks the hydrogen, micro bubbles with an average diameter greater than or equal to 1 μm and less than 1 mm are generated.

The ship fuel is prepared with the system in System Embodiment 1 by the above method, wherein:

the air pressure and the reaction temperature inside the fixed-bed reactor 4 in the step 6 are controlled to 4.5 MPa and 350° C.;

the catalyst in the step 7 is a molybdenum nickel catalyst, and the space velocity of the gas-liquid emulsion is controlled at 0.3 $h^{-1}$.

The heavy oil before and after the system is operated is tested, and the test results are as follows:

The sulfur content in the heavy oil of the raw material before the treatment of the system is 120 ppm, and the sulfur content in the ship fuel after the treatment of system is reduced to 25 ppm.

Examples 2

The steps of the method in the present Example are the same as those in Example 1.

The ship fuel is prepared with the system for the heavy oil in System Embodiment 1 by the above method, wherein:

in the step 5, a mixing ratio of the heavy oil and the hydrogen in each micro-interface generator is: a standard volume ratio of the hydrogen to the heavy oil is 0.25:1 in the first micro-interface generator, and a standard volume ratio of the hydrogen to the heavy oil is 900:1 in the second micro-interface generator;

in the step 5, after each micro-interface generator breaks the hydrogen, micro bubbles with an average diameter greater than or equal to 1 μm and less than 1 mm are generated;

the air pressure and the reaction temperature inside the fixed-bed reactor 4 in the step 6 are controlled to 5 MPa and 380° C.;

the catalyst in the step 7 is an iron cobalt catalyst, and the space velocity of the gas-liquid emulsion is controlled at 0.1 $h^{-1}$.

The heavy oil before and after the system is operated is tested, and the test results are as follows:

The sulfur content in the heavy oil of the raw material before the treatment of the system is 120 ppm, and the sulfur content in the ship fuel after the treatment of system is reduced to 32 ppm.

Examples 3

The steps of the method in the present Example are the same as those in Example 1.

The ship fuel is prepared with the system for the heavy oil in System Embodiment 1 by the above method, wherein:

in the step 5, a mixing ratio of the heavy oil and the hydrogen in each micro-interface generator is: a standard volume ratio of the hydrogen to the heavy oil is 0.35:1 in the first micro-interface generator, and a standard volume ratio of the hydrogen to the heavy oil is 800:1 in the second micro-interface generator;

in the step 5, after each micro-interface generator breaks the hydrogen, micro bubbles with an average diameter greater than or equal to 1 μm and less than 1 mm are generated;

the air pressure and the reaction temperature inside the fixed-bed reactor 4 in the step 6 are controlled to 13 MPa and 400° C.;

the catalyst in the step 7 is a nickel tungsten catalyst, and the space velocity of the gas-liquid emulsion is controlled at 0.5 $h^{-1}$.

The heavy oil before and after the system is operated is tested, and the test results are as follows:

The sulfur content in the heavy oil of the raw material before the treatment of the system is 120 ppm, and the sulfur content in the ship fuel after the treatment of system is reduced to 20 ppm.

Comparative Example 1

The present Comparative Example 1 selects the common fixed-bed reactor system in the prior art to prepare the ship fuel for the heavy oil, wherein:

the catalyst in the fixed-bed reactor is iron-cobalt catalyst; in the fixed-bed reactor, the reaction temperature is 410° C., the hydrogen pressure is 18 MPa, the hydrogen-to-oil volume ratio is 1200:1, and the space velocity of the mixture is 0.4 h$^{-1}$.

The gasoline before and after the system is operated is tested, and the test results are as follows:

The sulfur content in the gasoline of the raw material before the treatment of the system is 120 ppm, and the sulfur content in the modified gasoline after the treatment of system is reduced to 38 ppm.

The process parameters and the processed sulfur content in the above three examples and comparative examples are counted. The statistical results are shown in Table 1:

TABLE 1

Data comparison chart of heavy oil processing by the system of each embodiment

|  | Catalyst | Hydrogen pressure | Reaction temperature | Air speed | Gas-liquid ratio | Processed sulfur content |
|---|---|---|---|---|---|---|
| Examples 1 | Molybdenum nickel catalyst | 4.5 MPa | 350° C. | 0.1 h$^{-1}$ | 1000:1 | 25 ppm |
| Examples 2 | Iron cobalt catalyst | 5 MPa | 380° C. | 0.3 h$^{-1}$ | 900:1 | 32 ppm |
| Examples 3: | Nickel tungsten catalyst | 13 MPa | 400° C. | 0.5 h$^{-1}$ | 800:1 | 20 ppm |
| Comparative Example 1 | Iron cobalt catalyst | 18 MPa | 430° C. | 0.4 h$^{-1}$ | 1200:1 | 38 ppm |

It can be seen that the micro-interface strengthening reaction system and method for heavy oil hydrogenation preparation of ship fuel according to the present invention may effectively remove sulfur elements in the heavy oil under a medium, low pressure and low temperature environment.

So far, the technical solution of the invention has been described in conjunction with the preferred embodiments shown in the drawings. However, it is easily understood by those skilled in the art that the protection scope of the invention is obviously not limited to these specific embodiments. Without departing from the principle of the invention, those skilled in the art can make equivalent changes or substitutions to the relevant technical features, which will fall into the protection scope of the invention.

The above are only preferred embodiments of the invention rather than limits to the invention. Those skilled in the art may make various modifications and changes to the invention. Any modification, equivalent replacement, improvement and the like made within the spirit and principle of the invention all should be included in the protection scope of the invention.

The invention claimed is:

1. A micro-interface strengthening reaction system for heavy oil hydrogenation preparation of ship fuel, comprising:
   a liquid phase feed unit for storing and transporting heavy oil;
   a gas phase feed unit for storing and transporting hydrogen;
   at least one micro-interface generator, connected to the liquid phase feed unit and the gas phase feed unit respectively for converting a pressure energy of a gas and/or a kinetic energy of a liquid into a surface energy of a bubble and transfer the surface energy to a hydrogen bubble such that the hydrogen is broken to form micro-bubbles with a diameter greater than or equal to 1 μm and less than 1 mm to increase a mass transfer area between the heavy oil and the hydrogen and such that the heavy oil is mixed with the microbubbles to form a gas-liquid emulsion to enhance a reaction efficiency between the heavy oil and the hydrogen within a preset pressure range after the hydrogen is broken;
   a fixed-bed reactor, connected to the micro-interface generator for loading the gas-liquid emulsion and providing a reaction space for the heavy oil and the microbubbles in the gas-liquid emulsion;
   a separation tank for gas-liquid separation of a mixture of a ship fuel and a reacted mixed gas in the fixed-bed reactor;
   wherein the gas phase feed unit comprises:
   a gas raw material buffer tank, for storing hydrogen;
   a compressor, connected to the gas raw material buffer tank for providing power for the transportation of the hydrogen;
   a gas feed preheater, connected to the compressor for preheating the hydrogen transported by the compressor such that the heavy oil reaches a specified temperature, the gas feed preheater being provided a shunt pipe at an outlet for transporting the hydrogen to the corresponding micro-interface generator respectively;
   when the gas phase feed unit is transporting hydrogen, the compressor operates to pump the hydrogen from the gas raw material buffer tank and send the hydrogen to the gas feed preheater for preheating, and the gas feed preheater transports the hydrogen to the micro-interface generator so that the micro-interface generator breaks the hydrogen to a specified size after the preheating is completed.

2. The micro-interface strengthening reaction system for heavy oil hydrogenation preparation of ship fuel according to claim 1, wherein when the number of the micro-interface generators is greater than or equal to two, the micro-interface generators are arranged in parallel in series and/or parallel connection for outputting the mixed gas-liquid emulsion to the fixed-bed reactor for reaction.

3. The micro-interface strengthening reaction system for heavy oil hydrogenation preparation of ship fuel according to claim 2, wherein the micro-interface generator is one or more of a pneumatic micro-interface generator, a hydraulic micro-interface generator and a gas-liquid linkage micro-interface generator.

4. The micro-interface strengthening reaction system for heavy oil hydrogenation preparation of ship fuel according to claim 1, wherein the liquid phase feed unit comprises:
   a liquid raw material tank, for storing the heavy oil;
   a feed pump, connected to the liquid raw material tank for providing power for the transportation of the heavy oil;

a liquid feed preheater, connected to the feed pump for preheating the heavy oil transported by the feed pump such that the heavy oil reaches a specified temperature, the liquid feed preheater being provided a shunt pipe at an outlet for transporting the heavy oil to the corresponding micro-interface generator respectively;

when the liquid phase feed unit is transporting the heavy oil, the feed pump operates to pump the heavy oil out of the liquid raw material tank and send the heavy oil to the liquid feed preheater, and the liquid feed preheater heats the heavy oil to the specified temperature and then transports the gasoline to the micro-interface generator.

5. The micro-interface strengthening reaction system for heavy oil hydrogenation preparation of ship fuel according to claim 1, wherein the fixed-bed reactor comprises:

a reaction tank, a tank body for providing a reaction space for the gas-liquid emulsion, the reaction tank being provided with a discharge port for outputting a reacted ship fuel and a mixed gas;

at least one layer of catalyst bed, fixed at a specified position inside the reaction tank, the catalyst bed being inside provided with a catalyst for improving the reaction efficiency of each substance in the gas-liquid emulsion, wherein when the gas-liquid emulsion is flowing through the catalyst bed, the catalyst in the catalyst bed will contact the gas-liquid emulsion to improve the reaction efficiency of each substance in the gas-liquid emulsion.

6. The micro-interface strengthening reaction system for heavy oil hydrogenation preparation of ship fuel according to claim 1, wherein a top end of the separation tank is provided with a gas phase outlet for transporting the mixed gas, and a bottom end of the separation tank is provided with a liquid phase outlet for transporting the ship fuel, wherein after the gas-liquid emulsion is reacted in the fixed-bed reactor, the separation tank transports the reacted mixture to the separation tank, the ship fuel in the mixture settles to the bottom end of the separation tank by gravity and is output from the system through the liquid phase outlet, and the mixed gas in the mixture is output from the system through the gas phase outlet.

7. A micro-interface strengthening reaction method for heavy oil hydrogenation preparation of ship fuel, comprising steps of:

step 1: adding a specified amount of heavy oil to a liquid raw material tank and adding a specified amount of hydrogen to a gas raw material buffer tank before operating the system;

step 2: starting the system after the addition, extracting the heavy oil from the liquid raw material tank through the feed pump, and extracting the hydrogen from the gas raw material buffer tank through the compressor;

step 3: flowing the heavy oil through a liquid feed preheater, heating the heavy oil to a specified temperature by the liquid feed preheater, flowing the hydrogen through a gas feed preheater, and heating the hydrogen to a specified temperature by the gas feed preheater;

step 4: diverting the heavy oil after preheating, transporting the diverted heavy oil to corresponding micro-interface generators respectively, diverting the hydrogen after preheating, and transporting the diverted hydrogen to the corresponding micro-interface generators respectively;

step 5: controlling a ratio of the heavy oil and the hydrogen received respectively and breaking the hydrogen into micron-sized microbubbles by the micro-interface generator, and mixing the microbubbles with the heavy oil to form a gas-liquid emulsion by each of the micro-interface generators after breaking;

step 6: transporting the gas-liquid emulsion to a fixed-bed reactor by each of the micro-interface generators after mixing, controlling a pressure and a temperature in the fixed-bed reactor, and flowing the gas-liquid emulsion in a specified direction;

step 7: flowing the gas-liquid emulsion through a catalyst bed, controlling an airspeed of the gas-liquid emulsion such that the catalyst arranged in the catalyst bed promotes the reaction of sulfur elements inside the heavy oil in the gas-liquid emulsion with the microbubbles to form the ship fuel and a hydrogen sulfide gas, wherein the hydrogen sulfide gas may form the mixed gas with the hydrogen;

step 8: transporting a mixture formed by the ship fuel and the mixed gas to a separation tank by the fixed-bed reactor after the reaction, wherein the mixture settles in the separation tank, the ship fuel settles in a lower layer of the separation tank and is output from the system through the liquid phase outlet for subsequent processing, and the mixed gas stays in an upper layer of the separator tank after the ship fuel settles and is output from the system through the gas phase outlet for subsequent processing.

8. The micro-interface strengthening reaction method for heavy oil hydrogenation preparation of ship fuel according to claim 7, wherein the fixed-bed reactor in the step 6 has inside a reaction pressure of 1-14 MPa and a reaction temperature of 350-430° C.

9. The micro-interface strengthening reaction method for heavy oil hydrogenation preparation of ship fuel according to claim 7, wherein the gas-liquid emulsion in the step 7 has an airspeed of 0.1-0.5 $h^{-1}$.

* * * * *